United States Patent [19]

Boyce

[11] Patent Number: 4,608,497
[45] Date of Patent: Aug. 26, 1986

[54] OCEAN WAVE ENERGY CONVERTING VESSEL

[76] Inventor: Peter F. Boyce, Delsea Dr., Delmont, N.J. 08314

[21] Appl. No.: 719,524

[22] Filed: Apr. 3, 1985

[51] Int. Cl.⁴ .................... F03B 13/10; F03B 13/12; H02P 9/04
[52] U.S. Cl. .............. 290/53; 416/DIG. 4; 244/58; 244/17.11
[58] Field of Search ............. 290/42, 53; 417/330, 417/331, 332; 416/DIG. 4; 244/17.11, 8, 58

[56] References Cited

U.S. PATENT DOCUMENTS

| 851,549 | 4/1907 | Neal | 417/332 |
| 4,208,877 | 6/1980 | Evans et al. | 290/53 X |
| 4,317,042 | 2/1982 | de Almada | 290/53 |

FOREIGN PATENT DOCUMENTS 264286  1/1927  United Kingdom ............ 244/17.11

Primary Examiner—L. T. Hix
Assistant Examiner—Brian W. Brown

[57] ABSTRACT

An ocean wave energy converting vessel which can remain perpendicular to the ocean waves for maximum energy conversion, regardless of its direction of travel. As either end of the quadrapod is lifted by a wave and the pendulum deck tends toward the center of the earth, force is applied to the generator due to the shifting weight of the pendulum deck, generator battery bank and all other equipment on said deck. This results from cables looped around racheted pulleys on the generator shaft, connected at their ends to the bow and stern of the quadrapod. Maximum energy conversion depends upon the quadrapod being perpendicular to the ocean waves. The paradox of a vessel facing one direction while traveling another is resolved by a navigation system consisting of four simultaneously swiveling, finned, motorized pontoons to maintain course direction, operated in conjunction with a wind fan with rudder mounted to the pendulum deck which holds quadrapod perpendicular to ocean waves. Length of quadrapod is adjustable through the use of cables, pulleys and hydraulic pistons so as to match the distance from wave crest to valley. A plurality of units may be joined together, the beams of which may share pontoons to form an energy net spreading out over the ocean.

5 Claims, 2 Drawing Figures

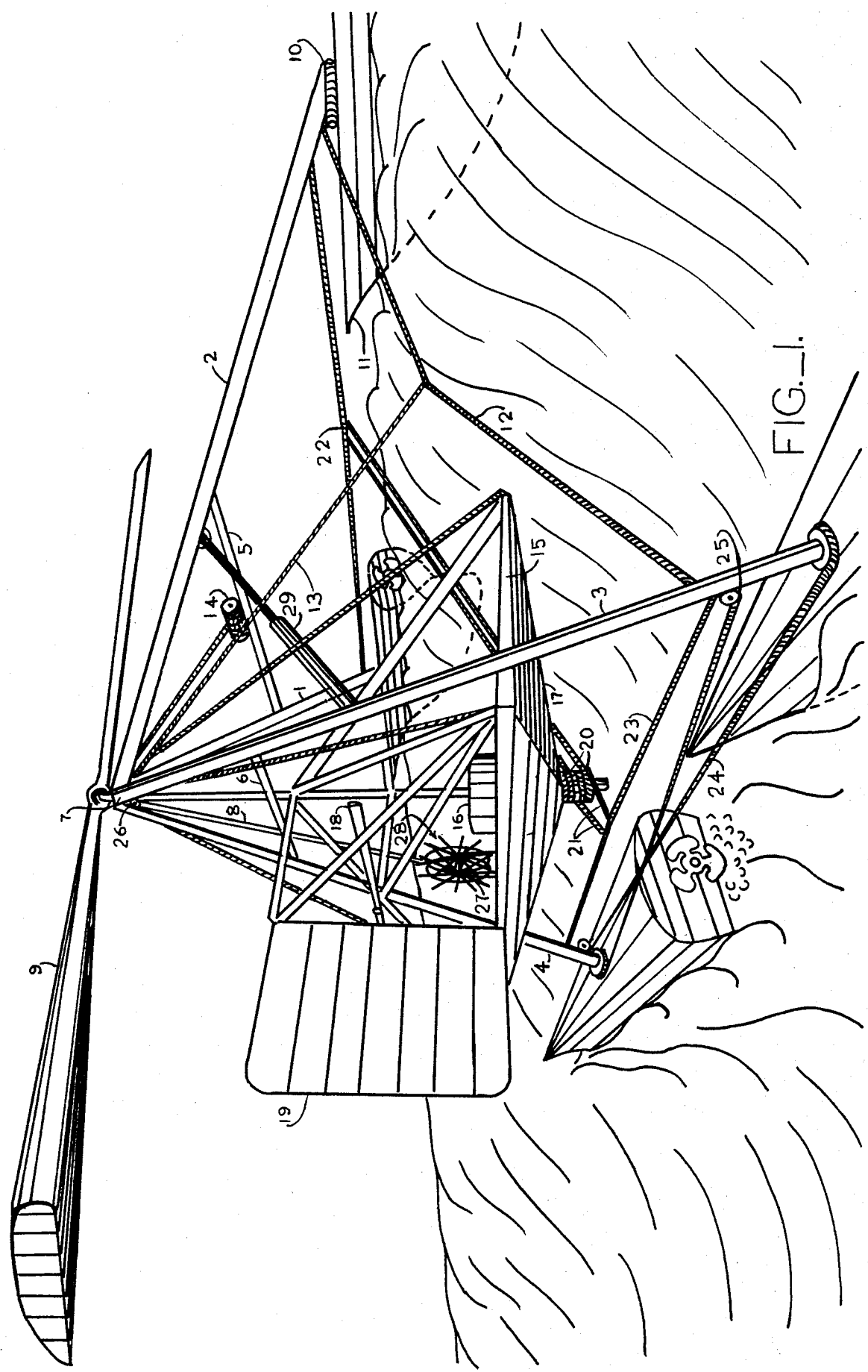
FIG._1.

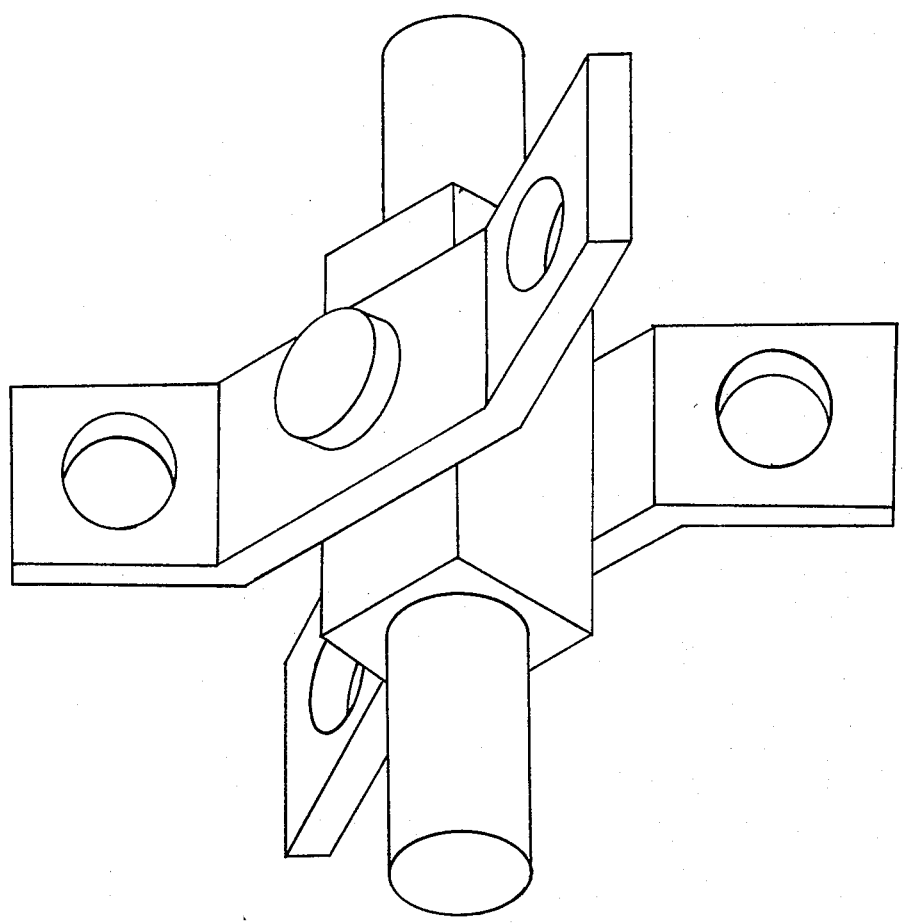
FIG._2.

006497

OCEAN WAVE ENERGY CONVERTING VESSEL

SUMMARY OF THE INVENTION

An ocean wave energy converting vessel, which is essentially an ocean wave energy conversion system so adapted as to be a navigable vessel.

The energy conversion system to be adapted is briefly a quadrapod supported by bouyant members. Suspended from the quadrapod is a deck, herein called the pendulum deck which tends toward the center of the earth as the quadrapod rocks over the waves. Mounted upon the pendulum deck is an electric generator having a splined vertical shaft with two racheted pulleys. Looped around each pulley is a cable, one cable looping clockwise, the other counterclockwise; said cables being attached at their ends to bow and stern beams of the quadrapod. The generator is thus made to spin as the distances from the pulleys to the bow and the stern of the quadrapod change, due to the rocking of the quadrapod and the tendency of the pendulum toward the center of the earth. The wave energy thus harnessed is stored in a bank of batteries beneath the pendulum deck. The system must remain perpendicular to the ocean waves for maximum energy conversion. The system, when equipped with conventional navigation controls sacrifices maximum energy conversion when it turns to follow a course other than one perpendicular to the waves. Therefore, a navigational system is needed which enables the energy conversion system to remain facing perpendicular to the waves, regardless of its direction of travel. This need is fulfilled by the use of four simultaneously swiveling finned, motorized pontoons and a large fan with rudder mounted on the pendulum deck. The pontoons maintain course direction, while the fan with rudder maintains maximum charging angle.

BRIEF DESCRIPTION OF THE DRAWINGS

FIG. 1 is a perspective view of the preferred emgbodiment of the invention; and

FIG. 2 is an enlarged view of the apex block.

The vessel is constructed as follows: Four sturdy beams—the port bow beam[1], starboard bow beam[2], starboard stern beam[3], and the port stern beam[4]. The two bow beams are joined at a 60° angle and a bow brace[5] to maintain the angle. Likewise, the two stern beams are joined by a stern brace[6] maintain their angle. The bow beam section is joined to the stern beam section by a hinged apex block[7], FIG. 2. The hinge consists of two bearing-type swivels, one on the port and one on the starboard sides of the apex block, said swivels do not extending through said block, but rather permit the vertical shaft 8 to pass through and rise above the apex. Mounted atop the shaft is a lift propeller[9]. At the foot of each beam is mounted a combination swivel and pulley[10] to which is mounted a finned, motorized pontoon[11]. Two length-adjustment cables[12], one on the port side, the other on the starboard connects the bow and stern beam together on either side of the vessel. Attached to the midpoint of each length-adjustment cable is a length-adjustment control cable[13] which runs through a pulley at the apex, and the end of which is attached to a winch[14] mounted on a bow brace. The winch is common to both port and starboard length-adjustment control cables, thereby adjusting the length of both sides simultaneously to match the distance from wave crest to valley for maximum energy production.

The winch is motorized and electrically controlled from the pendulum deck[15] which is suspended by cable from the apex of the quadrapod. The electric generator[16] also serves as the motor for the lift propeller. Mounted beneath the deck is the bank of batteries[17]. An angle-maintenance fan[18] is mounted with a horizontal shaft so as to push air sternward. A rudder[19] is mounted at the stern of the pendulum deck. The splind vertical shaft extends and is below the pendulum deck and is fitted with two racheted pulleys[20]. Two cables, herein called the swing cables[21] are looped several turns around its own racheted pulley, one looping clockwise, the other counterclockwise. The swing cables are attached at their ends to the bow cable[22] and the stern cable[23], so as to cause said generator to spin as the quadrapod rocks over the waves, and the pendulum deck swings relative to it in its tendency toward the center of the earth. Navigation of a chosen course is accomplished through two systems of cables and pulleys, wherein one controls the bow pontoons, and the other the stern pontoons. Each system consists of a continuous loop of cable. A cable is attached midway between the port and starboard beams, and proceeds to a pulley on the port pontoon mounted in a horizontal plane, having a common axis with the swivel. The cable then loops said pulley several turns and proceeds through a guide pulley[25], securely mounted at the ankle of the starboard leg. The cable then proceeds up a stern beam and through a pulley at the apex[26] then downward to the pendulum deck, and looping several turns around a control pulley[27] securely mounted to the pendulum deck, to which control pulley is mounted a steering wheel[28]. The cable then proceeds upward to the apex, through another guide pulley, down the port leg, through another guide pulley at the ankle of the port leg, across to the pontoon pulley on the starboard leg, making several loops around said pulley, it then returns to mesh with its starting point, The bow navigation system, being the same, and the steering wheels of each system, being adjacent to each other within a proximity to permit connecting pins to be inserted, allowing all four pontoons to be controlled simultaneously, or bow and stern separately at the option of the navigator.

As a safety measure, two hydraulic pistons[29], one on the port and one on the starboard sides, extend from the bow beam to the stern beam. These pistons, serve to maintain the quadrapod's length in the event the navigator inadvertently permits the quadrapod to turn parallel to the waves, causing the pendulum, in its tendency toward the center of the earth, to swing sideways against the swing cables causing a drawing in effect of the length and thereby applying a bending force upon the upward generator shaft extension against the apex block, which herein is not hinged for sideward movement of the pendulum deck. The hydraulic lines for said pistons run upward through pulleys mounted under the apex block, then downward to the pendulum deck where the tank pump and motor for said pistons is located.

A plurality of said vessels may be joined together at the ankles of the beams through increasing the displacement volume of the pontoons; vessels may share pontoons thereby spreading out over the ocean to form an ocean wave energy conversion net.

I claim:

1. An ocean wave energy conversion system comprised of a four beam quadrapod supported by bouyant members from which is suspended a pendulum, said pendulum containing a vertical generator shaft and a generator, said generator shaft being splined and fitted with two racheted pulleys, said pulleys being looped, one clockwise and one counterclockwise with separate cables, said cables being attached at their ends to the bow and stern of the quadrapod, whereby said generator shaft will spin when the quadrapod rocks over waves and the pendulum tends towards the center of earth.

2. The ocean wave energy conversion system as in claim 1, wherein said bouyant members comprise a swiveling, finned, motorized pontoon affixed to each of the four beams of the quadrapod.

3. The ocean wave energy conversion system as in claim 2, further including a navigation means comprising a wind-producing fan and a rudder operable in conjunction with said pontoons for maintaining course direction and maximum charging angle.

4. The ocean wave energy conversion system as in claim 1, further including a means through cables, pulleys and hydraulic pistons to adjust the quadrapods length to match the distance from wave crest to wave valley.

5. The ocean wave energy conversion system as in claim 1, further including an extended shaft rising upward from the generator through the apex of the quadrapod to which is mounted a means which will move in conjunction with the extended shaft when the generator is used as a motor.

* * * * *